US 9,768,437 B2

(12) United States Patent
Guen et al.

(10) Patent No.: US 9,768,437 B2
(45) Date of Patent: Sep. 19, 2017

(54) RECHARGEABLE BATTERY (71) Applicant: SAMSUNG SDI CO., LTD., Yongin-si, Gyeonggi-do (KR)

(72) Inventors: Minhyung Guen, Yongin-si (KR); Yongchul Seo, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 480 days.

(21) Appl. No.: 14/107,293

(22) Filed: Dec. 16, 2013

(65) Prior Publication Data

US 2015/0044526 A1    Feb. 12, 2015

Related U.S. Application Data

(60) Provisional application No. 61/864,139, filed on Aug. 9, 2013.

(51) Int. Cl.
*H01M 2/34* (2006.01)
*H01M 2/22* (2006.01)
*H01M 2/26* (2006.01)

(52) U.S. Cl.
CPC ............ *H01M 2/348* (2013.01); *H01M 2/22* (2013.01); *H01M 2/26* (2013.01); *H01M 2200/103* (2013.01)

(58) Field of Classification Search
None
See application file for complete search history.

(56) References Cited

U.S. PATENT DOCUMENTS

| | | | |
|---|---|---|---|
| 2004/0126650 A1* | 7/2004 | Kim | H01M 2/0426 429/61 |
| 2004/0170887 A1* | 9/2004 | Masumoto | H01M 2/0404 429/61 |
| 2011/0177387 A1* | 7/2011 | Byun | H01M 2/04 429/178 |
| 2011/0183165 A1 | 7/2011 | Byun et al. | |
| 2011/0300419 A1 | 12/2011 | Byun | |
| 2011/0305928 A1 | 12/2011 | Kim et al. | |
| 2012/0263976 A1* | 10/2012 | Byun | H01M 2/266 429/7 |
| 2013/0130066 A1* | 5/2013 | Pytlik | H01M 2/0222 429/7 |
| 2013/0295445 A1 | 11/2013 | Byun | |

FOREIGN PATENT DOCUMENTS

| | | |
|---|---|---|
| EP | 2 515 363 A1 | 10/2012 |
| EP | 2 575 189 A1 | 4/2013 |
| JP | 05-325943 A | 12/1993 |
| KR | 10-1036070 B1 | 5/2011 |
| KR | 2011-0084079 A | 7/2011 |
| KR | 2011-0133255 A | 12/2011 |
| KR | 2011-0135805 A | 12/2011 |

OTHER PUBLICATIONS

Search Report mailed Dec. 10, 2014 in corresponding European Patent Application No. 14157407.9.

* cited by examiner

*Primary Examiner* — Alix Eggerding
(74) *Attorney, Agent, or Firm* — Lee & Morse, P.C.

(57) ABSTRACT

A rechargeable battery including an electrode assembly; a terminal; and a current collector electrically connecting the electrode assembly and the terminal, the current collector including a first fuse for a first current and a second fuse for a second current, the first current being different from the second current.

16 Claims, 5 Drawing Sheets

RECHARGEABLE BATTERY

CROSS-REFERENCE TO RELATED APPLICATION

The present application claims priority under 35 U.S.C. §119(e) to U.S. Provisional Application No. 61/864,139, filed on Aug. 9, 2013, and entitled: "RECHARGEABLE BATTERY," which is incorporated herein by reference in its entirety.

BACKGROUND

1. Field

Embodiments relate to a rechargeable battery.

2. Description of the Related Art

Unlike primary batteries, which are not chargeable, rechargeable secondary batteries are chargeable and dischargeable. Low capacity batteries (that use single battery cells) may be used as power sources for various portable small-sized electronic devices such as cellular phones and camcorders. High power batteries (that use tens of battery cells connected to each other in a battery pack) may be used as power sources for hybrid vehicles or the like.

The rechargeable battery may be manufactured to have various shapes, e.g., cylindrical batteries and prismatic batteries. The rechargeable battery may be configured by accommodating an electrode assembly (having a positive plate and a negative plate and a separator as an insulator interposed therebetween) in a battery case with an electrolyte, and installing a cap plate having electrode terminals in the case. Positive and negative electrode terminals may be connected to the electrode assembly to then be exposed or protruded to the outside through the cap plate.

SUMMARY

Embodiments are directed to a rechargeable battery.

The embodiments may be realized by providing a rechargeable battery including an electrode assembly; a terminal; and a current collector electrically connecting the electrode assembly and the terminal, the current collector including a first fuse for a first current and a second fuse for a second current, the first current being different from the second current.

The current collector may include a terminal connection part coupled with the terminal, an electrode connection part coupled with the electrode assembly, and a connecting part connecting between the terminal connection part and the electrode connection part.

The first fuse may be on the terminal connection part of the current collector.

The second fuse may be on the connecting part of the current collector.

The first fuse may include a fuse hole penetrating the terminal connection part, the fuse hole reducing a cross sectional area of a region of the terminal connection part of the current collector.

The current collector may have an inverted-L shape such that the terminal connection part is perpendicular to the electrode connection part and the connecting part.

The second fuse may include fuse cut-outs, the fuse cut-outs reducing a certain cross sectional area of the connecting part of the current collector relative to other regions of the connecting part.

The fuse cut-outs may include a first fuse-cut out at one side of the connecting part, and a second fuse cut-out at another side of the connecting part, the other side of the connecting part being opposite to the one side of the connecting part.

The first fuse-cut out may have a size and shape that are about the same as a size and shape of the second fuse cut-out.

The first fuse-cut out may have a size and shape that are different from a size and shape of the second fuse cut-out.

The first fuse-cut out may have an area that is greater than an area of the second fuse cut-out.

The fuse cut-outs may be grooves extending inwardly from respective outer side edges of the connecting part.

The second fuse may further include a fuse protrusion between the fuse cut-outs, the fuse protrusion protruding toward the electrode assembly.

The second fuse may further include a fuse recess on the current collector and opposite to the fuse protrusion.

Melting of the second fuse may detach the electrode assembly from the terminal and drops the electrode assembly away from the terminal.

The rechargeable battery may further include another terminal; and another current collector, the other current collector including another first fuse.

The second fuse may be electrically connected between the first fuse and the electrode assembly.

The second fuse may have a larger cross sectional area than the first fuse.

The second fuse may be meltable in response to a lower current relative to a current in response to which the first fuse is meltable.

A width of remaining portions of the current collector at the first fuse may be less than a width of remaining portions of the current collector at the second fuse.

BRIEF DESCRIPTION OF THE DRAWINGS

Features will be apparent to those of skill in the art by describing in detail exemplary embodiments with reference to the attached drawings in which:

FIG. 1b illustrates a cross-sectional view taken along the line 1b-1b of FIG. 1a;

FIG. 2a illustrates an enlarged perspective view of a first current collector plate shown in FIG. 1a;

FIG. 2b illustrates an enlarged perspective view of a low-current fuse of the first current collector plate shown in FIG. 2a;

FIG. 3 illustrates a perspective view of another example of the first current collector plate shown in FIG. 1a; and FIG. 4 illustrates an enlarged perspective view of a second current collector plate shown in FIG. 1a.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. Further, it will be understood that when an element is referred to as being "under" another element, it can be directly under, or one or more intervening elements may also be present. In addition, it will also be understood that when an element is referred to as being "between" two elements, it can be the only element between the two elements, or one or more intervening elements may also be present. Like reference numerals refer to like elements throughout.

Figure 1A:
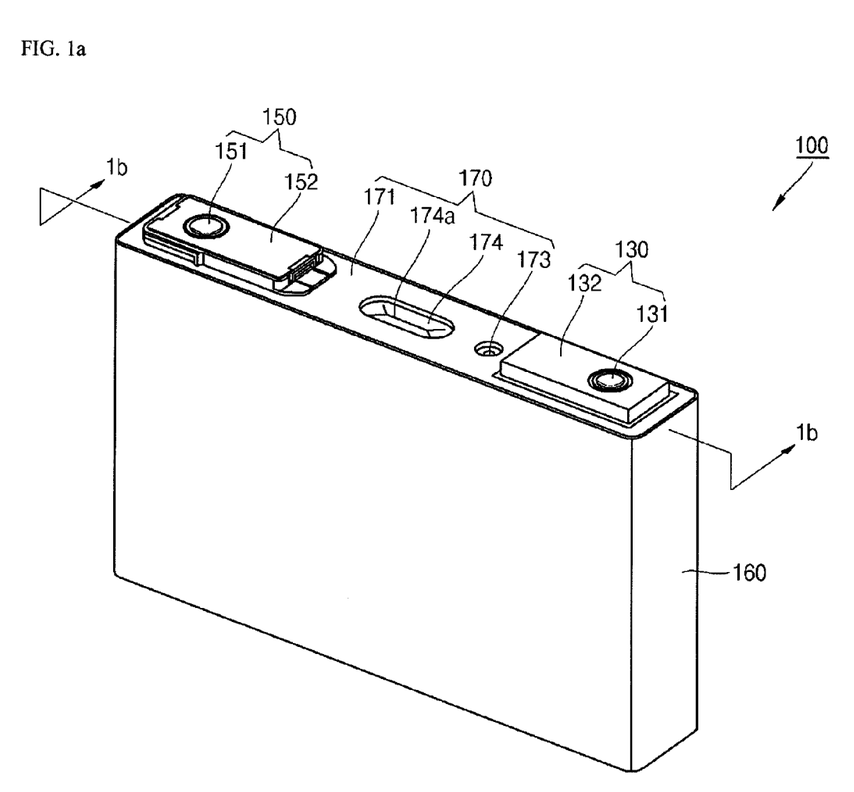
FIG. 1a illustrates a perspective view of a rechargeable battery according to an embodiment.
Figure 1B:
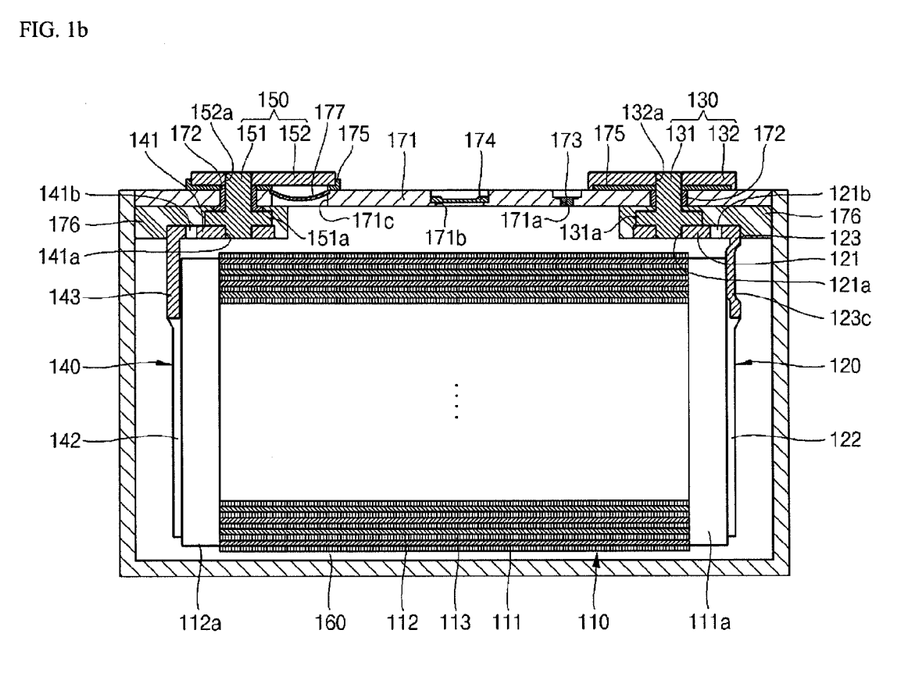

FIG. 1a illustrates a perspective view of a rechargeable battery according to an embodiment. FIG. 1b illustrates a cross-sectional view taken along the line 1b-1b of FIG. 1a.

As shown in FIGS. 1a and 1b, the rechargeable battery 100 according to an embodiment may include an electrode assembly 110, a first current collector plate 120, a first terminal part 130, a second current collector plate 140, a second terminal part 150, a case 160, and a cap assembly 170. A plurality of rechargeable batteries 100 may be connected to each other in series, thereby forming a large-capacity battery pack that outputs a high voltage.

The electrode assembly 110 may be formed by winding or laminating a stacked structure of a first electrode 111, a separator 113, and a second electrode 112, which are formed of thin plates or layers. In an implementation, the first electrode 111 may be a positive electrode, and the second electrode 112 may be a negative electrode, or vice versa.

The first electrode 111 may be formed by applying a first active material, e.g., a transition metal oxide, to a first current collector of a metal foil, e.g., aluminum, and may include a first electrode uncoated portion 111a that is not coated with the first active material. The first electrode uncoated portion 111a may function as a path of a flow of current between the first electrode 111 and an outside of the first electrode 111.

The second electrode 112 may be formed by applying a second active material, e.g., graphite or carbon, to a second electrode collector plate made of a metal foil, e.g., copper or nickel, and may include a second electrode uncoated portion 112a that is not coated with the second active material. The second electrode uncoated portion 112a may function as a path of a flow of current between the second electrode 112 and an outside of the second electrode 112.

The separator 113 may be interposed between the first electrode 111 and the second electrode 112 in order to prevent a short-circuit therebetween and to allow for the movement of lithium ions. The separator 113 may be formed of, e.g., polyethylene (PE), polypropylene (PP), or a composite film of PE and PP.

The first current collector plate 120 and the second current collector plate 140 may be coupled to opposing ends of the electrode assembly 110 electrically connected to the first electrode 111 and the second electrode 112, respectively. Preferably, the first current collector plate 120 and the second current collector plate 140 may be coupled to the first electrode uncoated portion 111a and the second electrode uncoated portion 112a at the opposing ends of the electrode assembly 110.

The electrode assembly 110 may be received in the case 160 along with an electrolyte. The electrolyte may include an organic solvent, e.g., ethylene carbonate (EC), propylene carbonate (PC), diethyl carbonate (DEC), ethyl methyl carbonate (EMC), or dimethyl carbonate (DMC), and a lithium salt, e.g., $LiPF_6$ or $LiBF_4$. The electrolyte may be a liquid, solid, and/or gel electrolyte.

Figure 2A:
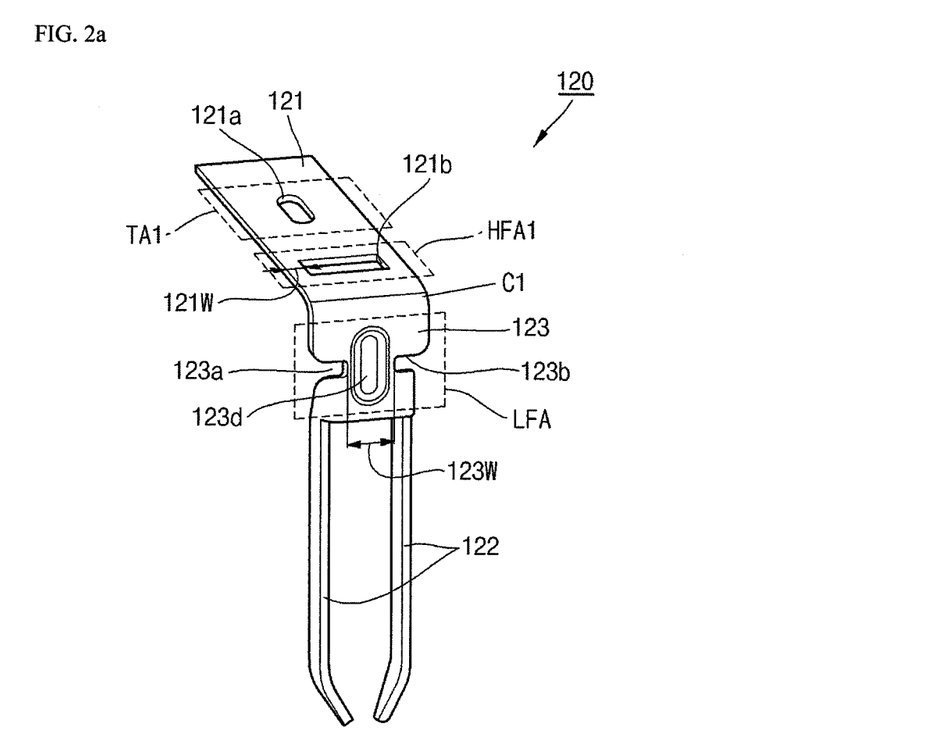
Figure 2B:
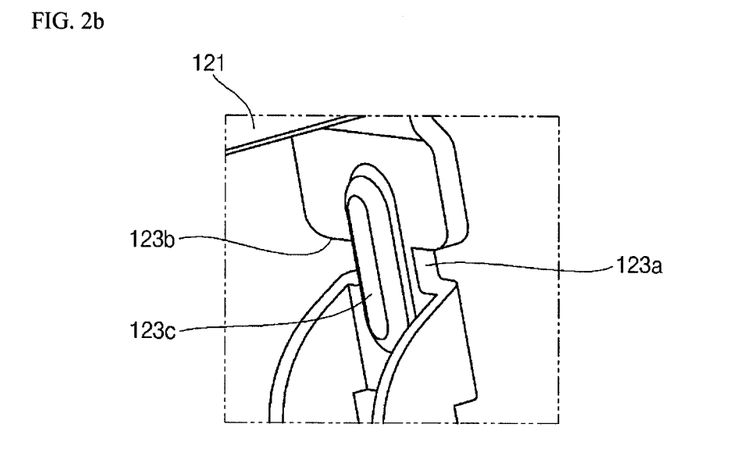

The first current collector plate 120 is shown in FIG. 2a, and a low-current fuse area LFA or second fuse of the first current collector plate 120 is shown in FIG. 2b.

A configuration of the first current collector plate 120 will now be described with reference to FIGS. 1a, 1b, 2a, and 2b.

The first current collector plate 120 may include a first electrode connection part 122 coupled with the first electrode 111, a first terminal connection part 121 coupled with the first terminal part 130, and a first connecting part 123 connecting between the first electrode connection part 122 and the first terminal connection part 121. The first current collector plate 120 may be formed as a single body. The first current collector plate 120 may include a first corner C1 bent between the first terminal connection part 121 and the first connecting part 123 and may be formed in a substantially inverted-L shape, e.g., '⌐' shape. In an implementation, the first current collector plate 120 may be made of, e.g., aluminum or an aluminum alloy.

The first electrode connection part 122 may contact the first electrode uncoated portion 111a protruding to one end of the electrode assembly 110 to then be electrically connected to the first electrode 111. The first electrode connection part 122 may be welded to the first electrode uncoated portion 111a and may be arranged to stand in a vertical direction. The first electrode connection part 122 may include as many first electrode connection parts as electrode assemblies received in the case 160. For example, each of the first electrode connection parts 121 may be welded to the first electrode uncoated portion 111a of the electrode assembly 110. The number of the first electrode connection parts 121 is exemplified as two (2) in FIG. 2a, but the embodiments are not limited thereto.

The first terminal connection part 121 may be welded to the first terminal part 130 and may be arranged in a substantially horizontally lying position between the cap plate 171 of the cap assembly 170 and the electrode assembly 110, which will be described below. A first fastening hole 121a and a first inner fuse hole 121b may be formed in the first terminal connection part 121 while passing through top and bottom surfaces of the first terminal connection part 121. The fuse hole may reduce a cross sectional area of a region of the terminal connection part 121 of the current collector 120.

A first fastening terminal 131 of the first terminal part 130 may be fitted into the first fastening hole 121a to be engaged therewith. For example, the first fastening hole 121a may be sized to correspond to the first fastening terminal 131 to allow the first fastening terminal 131 to be received therein. The first fastening hole 121a may be formed at one side of the first terminal connection part 121, e.g., a first terminal area TA1. The first terminal area TA1 may be positioned at a region of the first terminal connection part 121 to be distal to or spaced apart from the first corner C1.

The first inner fuse hole 121b may be formed in a first high-current fuse area or first fuse HFA1 opposite to the one side of the first terminal connection part 121 having the first fastening hole 121a. The first fuse HFA1 may be positioned at a region of the first terminal connection part 121 near the first corner C1 so as not to be overlapped with the first terminal area TA1. The first inner fuse hole 121b may be in a region of the first terminal connection part 121 such that the region of the first terminal connection part 121 including the first inner fuse hole 121b hs a sectional area smaller than other region of the first terminal connection part 121. Therefore, the first fuse HFA1 having the first inner fuse hole 121b may have a relatively high resistance value in the first terminal connection part 121. The first inner fuse hole 121b may have a rectangular shape elongated in a widthwise direction of the first terminal connection part 121 and parallel to the first corner C1. A width 121W of remaining portions of the terminal connection part 121 at either side of the first fuse HFA1 having the first inner fuse hole 121b may be about 1.6 mm to about 2.4 mm. The first inner fuse hole 121b may function as a fuse that blocks the flow of current by melting opposite sides of the first fuse HFA1 (including the first inner fuse hole 121b) by heat instantaneously generated when a first or high current (e.g., of about 3,000 A or greater) flows in the rechargeable battery 100 due to a high-current short-circuit occurring to the rechargeable battery 100.

Here, the high-current short-circuit may be caused by making the first short-circuit plate 178 and the second terminal part 150 contact each other when the internal pressure of the rechargeable battery 100 exceeds a preset pressure due to heat generated by over-charge and decomposition of an electrolytic solution. In addition, the high-current short-circuit may be caused by instantaneous high current of about 3,000 A or greater generated in the rechargeable battery 100 when the first terminal part 130 and the second terminal part 150 contact each other by an externally applied low-resistance conductive material. Accordingly, when instantaneous high current flows in the rechargeable battery 100 due to over-charge and/or external short-circuit, the first inner fuse hole 121b may block the flow of current in advance by allowing the region of or adjacent to the first inner fuse hole 121b to be instantaneously melted, thereby interrupting a charging or discharging operation of the rechargeable battery 100 before a dangerous condition, such as ignition or explosion, occurs to the rechargeable battery 100.

The first connecting part 123 may have one side connected to the first electrode connection part 122 and another side connected to the first terminal connection part 121. The first connecting part 123 may extend from a top end of the first electrode connection part 122, may have a plate shape, and may be arranged to stand in a vertical direction. The first connecting part 123 may be interposed between a lateral surface of the case 160 and the electrode assembly 110. The first terminal connection part 121 and the first connecting part 123 may be perpendicular to each other about the first corner C1 where the first connecting part 123 and the first terminal connection part 121 meet.

The first connecting part 123 may include the second fuse LFA having a first outer fuse hole or first fuse cut-out 123a passing through top and bottom surfaces of one end of the first connecting part 123 and a second outer fuse hole or second fuse cut-out 123b corresponding to or aligned with the first outer fuse hole 123a and passing through top and bottom surfaces of the other end of the first connecting part 123. For example, the fuse cut-outs may reduce a certain cross sectional area of the connecting part of the current collector relative to other regions of the connecting part. The one and the other ends of the first connecting part 123 may correspond to opposite ends of the first connecting part 123, which are perpendicular to the first corner C1. For example, the one and the other ends of the first connecting part 123 may be the opposite ends of the first connecting part 123 connecting one and the other sides of the first connecting part 123 connected to the first electrode connection part 122 and the first terminal connection part 121.

Figure 3:
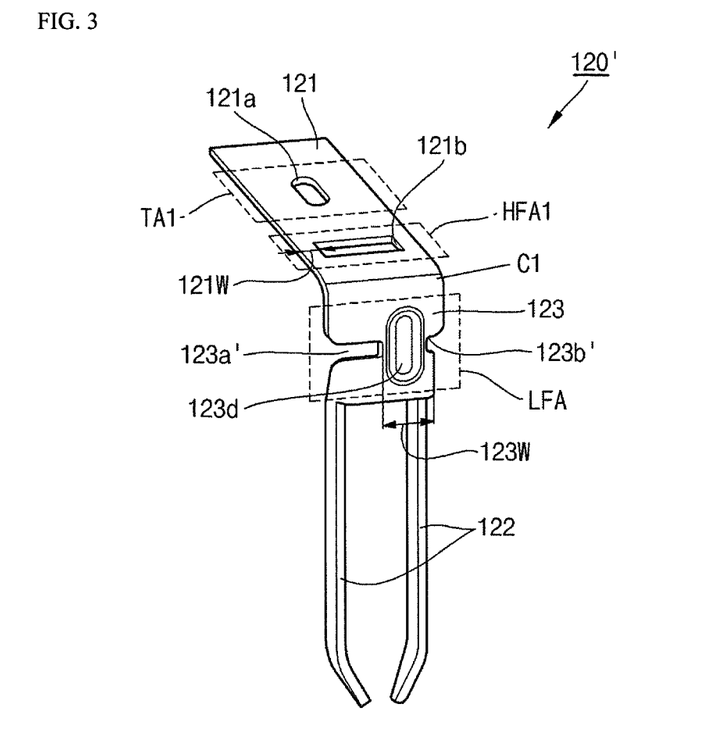

The first fuse cut-out 123a and the second fuse cut-out 123b may reduce a sectional area, compared to the other region of the first connecting part 123. In FIGS. 2a and 2b, the first fuse cut-out 123a and the second fuse cut-out 123b correspond to each other in view of location and shape. However, as shown in FIG. 3, a first fuse cut-out 123a' and a second fuse cut-out 123b' may be formed at locations corresponding to each other, and may have different sizes. For example, a first current collector plate 120' may be configured such that the first fuse cut-out 123a' and the second fuse cut-out 123b' have different sizes, as long as a width 123W of the second fuse LFA, corresponding to a distance between the first fuse cut-out 123a' and the second fuse cut-out 123b', is maintained at about 6.2 mm to about 7.2 mm. In an implementation, the first fuse-cut out 123a' may have a size and shape that are about the same as a size and shape of the second fuse cut-out 123b'. In an implementation, the first fuse-cut out 123a' may have a size and shape that are different from a size and shape of the second fuse cut-out 123b'. In an implementation, the first fuse-cut out 123a' may have an area that is greater than an area of the second fuse cut-out 123b'. In an implementation, the fuse cut-outs 123a', 123b' may be grooves extending inwardly from respective outer side edges of the connecting part 123.

The width 123W of the second fuse LFA, e.g., corresponding to the distance between the first fuse cut-out 123a and the second fuse cut-out 123b, may be maintained at about 6.2 mm to about 7.2 mm. The width of the second fuse LFA may be greater than that of the first fuse HFA1. Thus, the second fuse LFA may have lower resistance than the first fuse HFA1. However, the first fuse HFA1 may be positioned to be near the cap plate 171 to be described below. Thus, it may not be melted when low current is continuously applied, so that heat may be distributed through the cap plate 171, but may be melted by instantaneously applied high current. However, heat may not be separately distributed. Thus, the second fuse LFA may be melted when low current is continuously applied. In an implementation, the second fuse HFA1 may be electrically connected between the first fuse LFA and the electrode assembly 110. In an implementation, the second fuse LFA may have a larger cross sectional area than the first fuse HFA1. In an implementation, the second fuse LFA may be meltable in response to a lower current relative to a current in response to which the first fuse HFA1 may be meltable.

The first fuse cut-out 123a and the second fuse cut-out 123b may function as fuses blocking the flow of current by allowing the second fuse LFA to be melted by heat generated when a second current (e.g., a low current of about 2,000 A or less) flows in the rechargeable battery 100 for a predetermined time due to low-current short-circuit. In an implementation, the low-current short-circuit may be caused by the heat generated when the second current, e.g., the low current of about 2,000 A or less, is retained in the rechargeable battery 100 for a predetermined time due to contacts between each of the first terminal part 130 and the second terminal part 150 and an externally applied high-resistance conductive material. As described above, when the second fuse LFA is melted and broken by the low-current short-circuit, the electrode assembly 110 and the first electrode connection part 122 may drop to a lower portion of the case 160 due to gravity or a load of the electrode assembly 110 welded to the first electrode connection part 122 of the first current collector plate 120, thereby ensuring that the flow of current is blocked. In addition, the second fuse LFA may be provided in the vertically arranged first connecting part 123, thereby reducing a probability of explosion or ignition occurring due to an arc, compared to a case in which the first HFA1 is melted.

The second fuse LFA may further include a fuse protrusion 123c between the first fuse cut-out 123a and the second fuse cutout 123b and may be be spaced apart from the first fuse cutout 123a and the second fuse cutout 123b. In the second fuse LFA, the fuse protrusion 123c may be formed to protrude by applying pressure to locations spaced apart from the first fuse cutout and the second fuse cutout 123b. The fuse protrusion 123c may protrude from the case 160 toward the electrode assembly 110. The fuse protrusion 123c may reinforce the strength of the second fuse LFA and may help improve structural stability. In an implementation, the second fuse LFA may include a fuse recess 123d on the connecting part 123 of the current collector 120 and opposite to the fuse protrusion 123c.

The first terminal part 130 may be made of a metal or the like, and may be electrically connected to the first current collector plate 120. The first terminal part 130 may include a first fastening terminal 131 (received in the first fastening hole 121a of the first current collector plate 120) and a first electrode terminal 132 (engaged with the first fastening terminal 131).

The first fastening terminal 131 may pass through the cap plate 171 to be described below, and may extend upwardly by a predetermined length to then be electrically connected to the first current collector plate 120 under the cap plate 171. The first fastening terminal 131 may extend upwardly by a predetermined length and may protrude from the cap plate 171. A laterally extending flange 131a may be formed under the cap plate 171 so as to prevent the first fastening terminal 131 from being dislodged from the cap plate 171. A region of the first fastening terminal 131 under the flange 131a may be fitted into the first fastening hole 121a of the first current collector plate 120 and may be riveted or welded to the first current collector plate 120. In addition, a region of the first fastening terminal 131 on the flange 131a may pass through the cap plate 171 and may extend upwardly a predetermined length, and the first electrode terminal 132 may be fixed to the region.

The first electrode terminal 132 may be plate-shaped and may have a first terminal hole 132a passing through top and bottom surfaces thereof. The first terminal hole 132a of the first electrode terminal 132 may have a size and shape corresponding to a horizontal size and shape of the first fastening terminal 131 so as to receive the first fastening terminal 131. The first fastening terminal 131 may protrude upwardly from the cap plate 171, may be fitted into the first terminal hole 132a of the first electrode terminal 132, and may then be riveted or welded to the first electrode terminal 132.

The first terminal part 130 may be electrically insulated from the cap plate 171. The first terminal part 130 may be made of, e.g., aluminum, an aluminum alloy, or the like.

Figure 4:
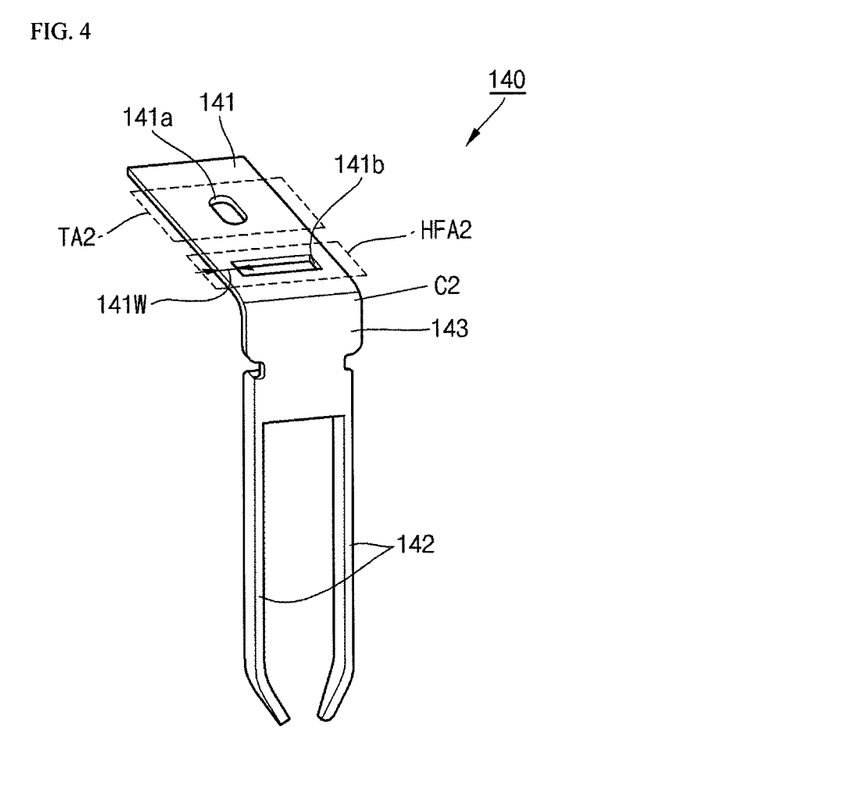

The second current collector plate 140 is shown in FIG. 4. A configuration of the second current collector plate 140 will now be described with reference to FIGS. 1a, 1b, and 4.

The second current collector plate 140 may include a second electrode connection part 142 connected to the second electrode 112, a second terminal connection part 141 connected to the second terminal part 150, and a second connecting part 143 connecting the second electrode connection part 142 and the second terminal connection part 141. The second current collector plate 140 may be formed as a single body. The second current collector plate 140 may include a second corner C2 bent between the second terminal connection part 141 and the second connecting part 143 and may be formed in a substantially inverted-L shape, e.g., 'ㄱ' shape. The second current collector plate 140 may be made of, e.g., copper, a copper alloy or the like.

The second electrode connection part 142 may contact second electrode uncoated portion 112a protruding at one end of the electrode assembly 110 to then be electrically connected to the second electrode 112. The second electrode connection part 142 may be welded to the second electrode uncoated portion 112a and may be arranged to stand in a vertical direction. The second electrode connection part 142 may include as many second electrode connection parts as electrode assemblies received in the case 160. Here, each of the second electrode connection parts 141 may be welded to the second electrode uncoated portion 112a of the electrode assembly 110. The number of the second electrode connection parts 141 is exemplified as two (2) in FIG. 2a.

The second terminal connection part 141 may be welded to the first terminal part 130, may be plate-shaped, and may be arranged substantially horizontally lying position between the cap plate 171 of the cap plate 170 and the electrode assembly 110. A second fastening hole 141a and a second inner fuse hole 141b may be formed in the second terminal connection part 141 while passing through top and bottom surfaces of the second terminal connection part 141.

A second fastening terminal 151 of the terminal part 150 may be fitted into the second fastening hole 141a to be engaged therewith. For example, the second fastening hole 141a may be sized to correspond to the second fastening terminal 131 to allow the second fastening terminal 131 to be received therein. The second fastening hole 141a may be formed at one side of the second terminal connection part 141, e.g., a second terminal area TA2. The second terminal area TA2 may be positioned at a region of the second terminal connection part 141 to be distal to or distantly spaced apart from the second corner C2.

The second inner fuse hole 141b may be formed in a second high-current fuse area opposite to one side of the second terminal connection part 141 having the second fastening hole 141a. For example, the second inner fuse hole 141b may form another first fuse HFA2. The other first fuse HFA2 may be positioned at a region of the second terminal connection part 141 near the second corner C2 so as not to be overlapped with the second terminal area TA2. The second inner fuse hole 141b may be a region of the second terminal connection part 141 such that the region of the terminal connection part 141 including the second fuse hole 141b has a sectional area smaller than other region of the second terminal connection part 141. Therefore, the other first fuse HFA2, including the second inner fuse hole 141b, may have a relatively high resistance value in the second current collector 140. The second inner fuse hole 141b may have a rectangular shape that is elongated in a widthwise direction of the second terminal connection part 141 and parallel to the second corner C2. A width 141W of remaining portions of the terminal connection part 141 at either side of the other first fuse HFA2 (that includes the second inner fuse hole 141b) may be about 1.6 mm to about 2.4 mm. The second inner fuse hole 141b may be part of the other first fuse HFA2 that blocks the flow of current by allowing opposite sides of the second terminal connection part 141 having the second inner fuse hole 141b therein to be melted by heat instantaneously generated when the first current (e.g., the high current of 3,000 A or greater) flows in the rechargeable battery 100 due to a high-current short-circuit occurring to the rechargeable battery 100.

In an implementation, the high-current short-circuit may be caused by making the second short-circuit plate 178 and the second terminal part 150 contact each other when the internal pressure of the rechargeable battery 100 exceeds a preset pressure due to heat generated by over-charge and decomposition of an electrolytic solution. In addition, the high-current short-circuit may be caused by instantaneous high current of 3,000 A or greater generated in the rechargeable battery 100 when the first terminal part 130 and the second terminal part 150 contact each other by an externally applied low-resistance conductive material. Accordingly, when instantaneous high current flows in the rechargeable battery 100 due to over-charge and external short-circuit, the first inner fuse hole 121b may block the flow of current in advance by allowing the region adjacent to the first inner fuse hole 121b to be instantaneously melted, thereby interrupting a charging or discharging operation of the rechargeable battery 100 before a dangerous condition, e.g., ignition or explosion, occurs to the rechargeable battery 100.

The second connecting part 143 may include one side connected to the second electrode connection part 142 and another side connected to the second terminal connection part 141. The second connecting part 143 may extend from a top end of the second electrode connection part 142 and may have a plate shape arranged to stand in a vertical direction. The second connecting part 143 may be interposed between a lateral surface of the case 160 and the electrode assembly 110. The second terminal connection part 141 and the second connecting part 143 may be perpendicular to each other about the second corner C2 where the second connecting part 143 and the second terminal connection part 141 meet.

The second terminal part 150 may be made of a metal or the like and may be electrically connected to the second current collector plate 140. The second terminal part 150 may include a second fastening terminal 151 received in the second fastening hole 141a of the second current collector plate 140, and a second electrode terminal 152 engaged with the second fastening terminal 151.

The second fastening terminal 151 may pass through the cap plate 171 to be described below and may extend upwardly by a predetermined length to then be electrically connected to the second current collector plate 140 under the cap plate 171. A region of the second fastening terminal 151 under a flange 151a may be fitted into the second fastening hole 141a of the second current collector plate 140 and may be riveted or welded to the second current collector plate 140. In addition, a region of the second fastening terminal 151 on the flange 151a may pass through the cap plate 171 and may extend upwardly a predetermined length, and the second electrode terminal 152 may be fixed to the region. The second terminal part 150 may have substantially the same configuration as the first terminal part 130.

The case 160 may be made from an electrically conductive metal, e.g., steel plated with aluminum, an aluminum alloy, or nickel, and may be formed in an approximately rectangular parallelepiped so as to form a space receiving the electrode assembly 110, the first current collector plate 120, and the second current collector plate 140. FIGS. 1a and 1b illustrate an assembled state in which the case 160 and the cap assembly 170 are combined with each other, and an opening is not illustrated. However, the opening may be a substantially opened peripheral portion of the cap assembly 170. An internal surface of the case 160 may be insulated, so that the case 160 is insulated from the electrode assembly 110, the first current collector plate 120, the second current collector plate 140, and the cap assembly 170.

The cap assembly 170 may be combined with the case 160. For example, the cap assembly 170 may include a cap plate 171, a seal gasket 172, a plug 173, a safety vent 174, an upper insulation member 175, a lower insulation member 176, and a short-circuit plate 177.

The cap plate 171 may seal the opening of the case 160 and may be made of the same material as the case 160. For example, the cap plate 171 may be combined with the case 160 by laser welding. Here, if the cap plate 171 is electrically connected to the first terminal part 130, the cap plate 171 may have the same polarity as the first terminal part 130. Accordingly, the cap plate 171 and the case 160 may have the same polarity.

The seal gasket 172 may be made of an insulating material and may be formed between each of the first fastening terminal 131 and the second fastening terminal 151 and the cap plate 171, thereby sealing portions between each of the first fastening terminal 131 and the second fastening terminal 151 and the cap plate 171. The seal gasket 172 may help prevent external moisture from flowing into the rechargeable battery 100 and/or may help prevent an electrolyte accommodated in the rechargeable battery 100 from flowing out.

The plug 173 may seal an electrolyte injection hole 171a of the cap plate 171. The safety vent 174 may be installed in a vent hole 171b of the cap plate 171 and may has a notch 174a configured to be opened at a preset pressure.

The upper insulation member 175 may be installed between the second short-circuit plate 179 and the cap plate 171 to electrically insulate the second short-circuit plate 179 and the cap plate 171 and from each other. In addition, the upper insulation member 175 may closely or directly contact the cap plate 171. Further, the upper insulation member 175 may also closely or directly contact the seal gasket 172. The upper insulation member 175 may insulate the second terminal part 150 and the cap plate 171 from each other. In addition, the upper insulation member 175 may be between the first electrode terminal 132 and the cap plate 171, and a portion of the first electrode terminal 132 may be electrically connected to the cap plate 171 in contact with the cap plate 171.

The lower insulation member 176 may be installed between each of the first current collector plate 120 and the second current collector plate 140 and the cap plate 171 to help prevent undesirable electrical short-circuits from occurring. For example, the lower insulation member 176 may help prevent a short-circuit between the first current collector plate 120 and the cap plate 171 and/or a short-circuit between the second current collector plate 140 and the cap plate 171. In addition, the lower insulation member 176 may be installed between each of the first electrode terminal 132 and the second electrode terminal 152 and the cap plate 171, thereby helping to prevent undesirable short-circuits between each of the first electrode terminal 132 and the second electrode terminal 152 and the cap plate 171.

The short-circuit plate 177 may be installed between the upper insulation member 175 and the cap plate 171 in the short-circuit hole 171 c of the cap plate 171. The short-circuit plate 177 may be formed of an inverting plate having a downwardly convex round part, and an edge part fixed to the cap plate 171. The first short-circuit plate 177 may be inverted to upwardly convexly protrude when the internal pressure of the rechargeable battery 100 exceeds a predefined pressure due to over-charge. When the short-circuit plate 177 upwardly convexly protrudes, it may contact the second electrode terminal 152, thereby causing an electrical short-circuit. If the short-circuit is caused, a large amount of current may flow, thereby generating heat. Thus, the one first fuse HFA1 having the first inner fuse hole 121b of the first current collector plate 120 and the other first fuse HFA2 having the second inner fuse hole 141b of the second current collector plate 140 may be melted and function as fuses.

If the high-current short-circuit occurs to the rechargeable battery 100, the first fuses HFA1 and HFA2 in the first current collector plate 120 and the second current collector plate 140 may be melted by instantaneously generated high heat due to high current and thus may perform their function as fuses. If the low-current short-circuit occurs in the rechargeable battery 100, the second fuse LFA may perform its function as a fuse by continuously applying low current to the second LFA provided in the first current collector plate 120 for a predetermined time or longer. For example, the rechargeable battery 100 may help improve safety by interrupting current using a single low-current fuse area in the event of a low-current short-circuit as well as high-current short-circuit, and may help reduce the risk of explosion due to arc generation, compared to a case in which two fuse areas are melted. In addition, the rechargeable battery 100 may facilitate current interruption using a low-current second fuse LFA provided at a side of the current collector plate 120, when a fuse operates such that the electrode assembly 110 is dropped to a lower portion of the case 160 due to a load or weight of the electrode assembly 110 when the low-current second fuse LFA is melted and broken.

By way of summation and review, when an external short-circuit, over-charge, or damages due to, e.g., nail penetration, occur to the rechargeable battery, ignition or explosion may result. Accordingly, a secondary battery should have improved safety.

The embodiments may provide a rechargeable battery, which may improve safety by interrupting current using a single low-current fuse in events of low-current short-circuit as well as high-current short-circuit, and may reduce a risk of explosion due to arc generation, compared to a case in which two fuse areas are melted.

The embodiments may provide a rechargeable battery, which may facilitate current interruption using a low-current fuse at a side of a current collector plate when a fuse operates such that an electrode assembly is dropped to a lower portion of a case due to a load of the electrode assembly or gravity when the low-current fuse is melted and broken.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A rechargeable battery, comprising:
an electrode assembly;
a terminal; and
a current collector electrically connecting the electrode assembly and the terminal, the current collector including a first fuse for a first current and a second fuse for a second current, the first current being different from the second current, and in that the current collector is positioned with respect to the terminal such that in melting of the second fuse detaches the electrode assembly from the terminal and drops the electrode assembly away from the terminal, wherein the current collector includes:
a terminal connection part coupled with the terminal,
an electrode connection part coupled with the electrode assembly and formed perpendicular to the terminal connection part,
a connecting part connected between the terminal connection part and the electrode connection part and formed perpendicular to the terminal connection part, wherein the first fuse is on the terminal connection part of the current collector and the second fuse is on the connecting part of the current collector, and wherein the second fuse has a larger cross-sectional area than the first fuse and the second fuse is meltable in response to a lower current relative to a current in response to which the first fuse is meltable.

2. The rechargeable battery as claimed in claim 1, wherein the first fuse includes a fuse hole penetrating the terminal connection part, the fuse hole reducing a cross sectional area of a region of the terminal connection part of the current collector.

3. The rechargeable battery as claimed in claim 1, wherein the current collector has an inverted-L shape.

4. The rechargeable battery as claimed in claim 1, wherein the second fuse includes fuse cut-outs, the fuse cut-outs reducing a certain cross sectional area of the connecting part of the current collector relative to other regions of the connecting part.

5. The rechargeable battery as claimed in claim 4, wherein the fuse cut-outs include:
a first fuse-cut out at one side of the connecting part, and
a second fuse cut-out at another side of the connecting part, the other side of the connecting part being opposite to the one side of the connecting part.

6. The rechargeable battery as claimed in claim 5, wherein the first fuse cut-out has a size and shape that are about the same as a size and shape of the second fuse cut-out.

7. The rechargeable battery as claimed in claim 5, wherein the first fuse cut-out has a size and shape that are different from a size and shape of the second fuse cut-out.

8. The rechargeable battery as claimed in claim 5, wherein the first fuse cut-out has an area that is greater than an area of the second fuse cut-out.

9. The rechargeable battery as claimed in claim 4, wherein the fuse cut-outs are grooves extending inwardly from respective outer side edges of the connecting part.

10. The rechargeable battery as claimed in claim 4, wherein the second fuse further includes a fuse protrusion between the fuse cut-outs, the fuse protrusion protruding toward the electrode assembly.

11. The rechargeable battery as claimed in claim 10, wherein the second fuse further includes a fuse recess on the current collector and opposite to the fuse protrusion.

12. The rechargeable battery as claimed in claim 1, further comprising:
another terminal; and
another current collector, the other current collector including another first fuse.

13. The rechargeable battery as claimed in claim 1, wherein the second fuse is electrically connected between the first fuse and the electrode assembly.

14. The rechargeable battery as claimed in claim 1, wherein the second fuse has a larger cross sectional area than the first fuse.

15. The rechargeable battery as claimed in claim 1, wherein the second fuse is meltable in response to a lower current relative to a current in response to which the first fuse is meltable.

16. The rechargeable battery as claimed in claim 1, wherein a width of remaining portions of the current collector at the first fuse is less than a width of remaining portions of the current collector at the second fuse.

* * * * *